Aug. 18, 1931. J. UNTERHOLZNER 1,819,347
TEMPERATURE INDICATOR
Filed June 13, 1930 2 Sheets-Sheet 1

Josef Unterholzner
INVENTOR

Aug. 18, 1931.   J. UNTERHOLZNER   1,819,347
TEMPERATURE INDICATOR
Filed June 13, 1930    2 Sheets-Sheet 2
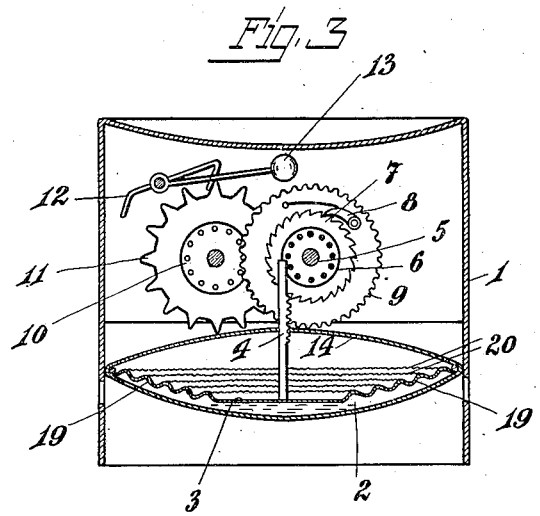
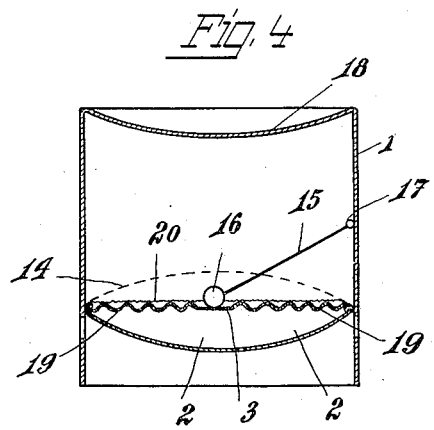
Josef Unterholzner
INVENTOR Patented Aug. 18, 1931

1,819,347

UNITED STATES PATENT OFFICE

JOSEF UNTERHOLZNER, OF MUNICH, GERMANY

TEMPERATURE INDICATOR

Application filed June 13, 1930, Serial No. 461,034, and in Germany June 19, 1929.

The invention is concerned with temperature alarms intended more particularly, but not exclusively, for use with liquids, for example for indicating the temperature of liquids such as milk or water shortly before they reach the boiling point.

According to the invention an airtight chamber is used, containing air or other gas at a suitable pressure, with the signalling device, or a device for actuating the signal, in this chamber, and a thermostat of the aneroid type having its elastic cover or its diaphragm exposed to the pressure in this chamber and adapted to actuate the signalling device.

By the use of the airtight chamber the signal device is completely protected against the harmful effects of liquid and vapor and the formation of unhygienic decomposition products within the chamber is prevented.

Figure 1:
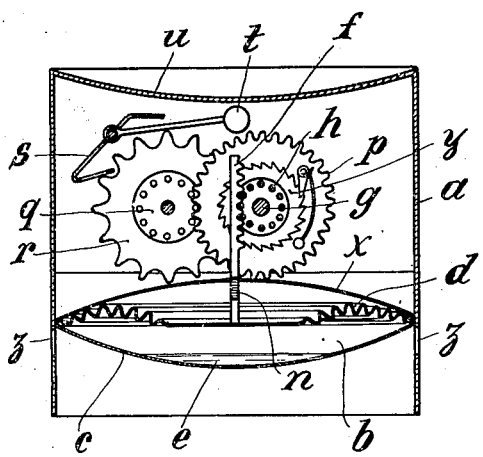
Figure 2:
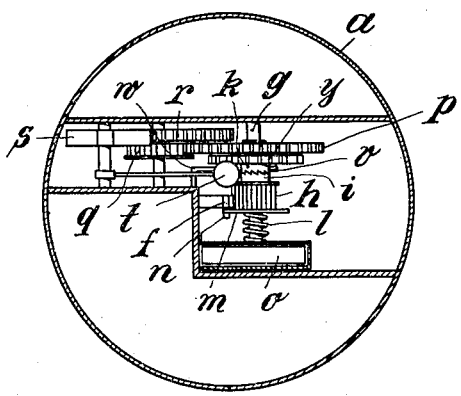

Three examples of apparatus according to the invention are shown in the annexed drawings in Figs. 1 and 2, Fig. 3 and Fig. 4 respectively, Fig. 1 being a vertical section, Fig. 2 a horizontal section, and Figs. 3 and 4 vertical sections.

Referring first to Figs. 1 and 2, $a$ is a hollow, air-tight float, and $b$ is a metal box, the floor $c$ of which constitutes also the floor of the float. The box $b$ forms an aneroid thermostat, and there may be a partial vacuum therein. It contains also a small quantity of liquid $e$, e. g. water. Its covers or diaphragm $d$, which is of elastic sheet metal with concentric corrugations, has fixed to it a vertical rack $f$ meshing with a lantern wheel $h$, which is slidable and freely rotatable on a shaft $g$, and to which is fixed the axially movable member $i$ of a dog clutch, the other member $k$ being fixed to the shaft $g$. The member $k$ is also fixed to a ratchet wheel $y$. A spring $l$ tends to hold the dog clutch in engagement. The lantern wheel $h$ has a flange $m$ in the path of an abutment $n$ projecting from the rack $f$. To the shaft $g$ is attached one end of a spiral spring $o$ for actuating a train of toothed gear $p$, $q$, $r$, and a pallet $s$ on a spindle carrying a hammer $t$. The latter strikes the top $u$ of the float, which is resonant. The wheel $p$ is connected with the ratchet wheel $y$ by a spring loaded pawl on the wheel $p$. Fixed to the clutch member $k$ is an abutment $v$ normally held against a resilient abutment $w$. The arching of the top $d$ of the aneroid $b$ is limited by a wire net $x$. The wall of the float extends downwards below the bottom of the aneroid $b$, so that the float can stand without imposing stress on the bottom of the aneroid. The wall has openings $z$ below the aneroid, for escape of air when the float is placed on liquid.

Normally the cover $d$ of the aneroid box is pressed against the bottom $c$ by the pressure in the float $a$, but when the liquid in the box is heated and evaporated the cover is raised with the rack $f$, and the rack winds the spring $o$ till the abutment $n$ strikes the flange $m$ and laterally displaces the wheel $h$ and clutch member $i$, thus disengaging the clutch. The shaft $g$ is by this means released for rotation by the spring $o$, and the hammer $t$ gives the alarm. When the vapour in the aneroid box $b$ becomes condensed the rack descends and allows the clutch $i$, $k$ to become engaged again.

The temperature at which the abutment $n$ releases the wheel $h$ is the temperature at which the pressure in the aneroid box, tending to lift the rack $f$, is balanced by the forces opposing it. These forces are:—

1. The resilience of the cover $d$.
2. The downward thrust of the rack $f$.
3. The gas pressure in the float $a$.

As regards the first of these forces, the cover $d$ is preferably so constructed that in the earlier part of the upward movement it assists the lift due to the vapour pressure in the box $b$, and then opposes this lift. The pressure in the float $a$, which does not materially change, is below the saturation pressure of the vapour at the critical temperature.

The return of the parts to normal position on cooling is very rapid, owing to the rapid drop of the vapour pressure curve and the small amount of stored heat to be dissipated.

The apparatus may be used for temperatures above 100° C., with an adequately high air pressure in the float a.

In the modifications shown in Figs. 3 and 4 the expansion of the aneroid box does not wind a spring.

In Fig. 3, 1 designates a hollow float, and 2 an aneroid box, with elastic cover 3, all substantially similar to the construction described with reference to Figs. 1 and 2. A rack 4 actuates a lantern wheel 6 fixed to a shaft 5, and to the shaft is also fixed a ratchet wheel 7 engaged with a pawl 8 pivoted to a gear wheel 9 rotatable on the shaft. The wheel 9 actuates wheels 10, 11 and a pallet 12 on the spindle of a hammer 12. A wire net 14 limits the expansion of the box 2.

The cover 3 of the box is constructed so that in a central position between full expansion and full contraction it is in a state of unstable equilibrium, and that in this state a very slight bias in one or the other direction will cause it to snap upwards or downwards. When at rest, it is held against the floor of the box by the air pressure in the float 1. When upon heating, the vapor pressure in the thermostat exceeds the air pressure in float 1, the excess pressure determined by the elastic conditions presses upwardly against the diaphragm until unstable equilibrium is reached, whereupon the top tooth of the rack 4 engages the lantern wheel 6, and the rack, moving rapidly upwards, actuates the hammer 13, which strikes the resonant top of the float. On cooling, the pressure in the float causes the cover 19 rapidly to collapse again.

In the modification shown in Fig. 4 the shank 15 of a hammer 16 is pivoted at 17 to the wall of the float 1 and rests on the cover 3 of the aneroid box 2. Alternatively it may be held by the guard net 14 in a position in which it is normally clear of the cover 3. When the box expands, and the cover 3 snaps into its fully raised position from its position of unstable equilibrium it flings the hammer against the resonant top 18 of the float.

Elastic covers or diaphragms of the usual type, with plain concentric corrugations, are less well adapted for the purpose described than covers shaped as shown diagrammatically in Figs. 3 and 4, wherein the concentric corrugations 19 have transverse corrugations 20. With plain concentric corrugations there is practically no elasticity in the tangential direction. The cover may, with such corrugations, be regarded as composed of numerous concentric rings, which are severally incapable of expansion and contraction. By superimposing on the concentric corrugations a system of transverse corrugations, which may be of comparatively small amplitude, the circular corrugations are themselves rendered capable of expansion and contraction within limits.

I claim:

1. A temperature alarm comprising an airtight, gas-filled chamber, an aneroid thermostat having an elastic wall exposed to the gas pressure in said chamber, and signalling means in said chamber actuatable by said elastic wall.

2. A temperature alarm comprising an airtight, gas-filled chamber, an aneroid thermostat having an elastic wall exposed to the gas pressure in said chamber, signalling means in said chamber and a spring in the chamber adapted to be stressed by said elastic wall to actuate said signalling means.

3. A temperature alarm, comprising the combination with the elements claimed in claim 2, of a train of gear actuated by said spring and an acoustic hammer actuated by said train of gear.

4. A temperature alarm comprising an airtight, gas-filled chamber having a wall of which a portion at least is resonant, an aneroid thermostat having an elastic wall exposed to the gas pressure in said chamber, and an acoustic hammer in the chamber adapted to be moved through the intermediary of said elastic wall into contact with said resonant wall.

5. A temperature alarm comprising an airtight, gas-filled chamber having a wall of which a portion at least is resonant, an aneroid thermostat having an elastic wall exposed to the gas pressure in said chamber, said elastic wall having concentric corrugations with transverse corrugations superimposed thereon, and an acoustic hammer in the chamber adapted to be moved through the intermediary of said elastic wall into contact with said resonant wall.

6. A temperature alarm comprising an airtight, gas-filled chamber, an aneroid thermostat within said chamber forming the floor thereof, said thermostat having an elastic wall exposed to the gas pressure in the chamber, and signalling means in said chamber actuatable by said elastic wall.

7. A temperature alarm comprising an airtight, gas-filled chamber having a perforation in the lower part of its wall, an aneroid thermostat within said chamber above said perforation and forming the floor of the chamber, said thermostat having an elastic wall exposed to the gas pressure in the chamber, and signalling means in said chamber actuatable by said elastic wall.

8. A temperature alarm comprising an airtight gas-filled chamber having a wall of which a portion at least is resonant, an aneroid thermostat having an elastic wall capable of springing from a position of unstable equilibrium to fully expanded position and exposed to the gas pressure in said chamber, and an acoustic hammer in the path of said elastic wall and adapted to be flung by the latter when expanding against said resonant wall.

In testimony whereof I hereunto affix my signature.

JOSEF UNTERHOLZNER.